United States Patent
Fang et al.

(10) Patent No.: US 11,646,920 B2
(45) Date of Patent: May 9, 2023

(54) DIFFERENTIAL CHAOS SHIFT KEYING COMMUNICATION METHOD AND SYSTEM BASED ON HYBRID INDEX

(71) Applicant: Guangdong University of Technology, Guangzhou (CN)

(72) Inventors: Yi Fang, Guangzhou (CN); Yiwei Tao, Guangzhou (CN); Huan Ma, Guangzhou (CN); Guojun Han, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 17/865,238

(22) Filed: Jul. 14, 2022

(65) Prior Publication Data

US 2022/0360478 A1    Nov. 10, 2022

(30) Foreign Application Priority Data

Jul. 16, 2021 (CN) .......................... 202110809151.1

(51) Int. Cl.
*H04L 27/00* (2006.01)
*G06F 17/14* (2006.01)
*H04L 9/00* (2022.01)

(52) U.S. Cl.
CPC ............ *H04L 27/001* (2013.01); *G06F 17/14* (2013.01); *H04L 9/001* (2013.01)

(58) Field of Classification Search
CPC . G06F 17/14; H04L 2209/805; H04L 27/001; H04L 9/001; Y02D 30/07
See application file for complete search history.

(56) References Cited

FOREIGN PATENT DOCUMENTS

| CN | 106209712 A | 12/2016 |
|---|---|---|
| CN | 106817330 A | 6/2017 |
| CN | 111756664 A | 10/2020 |
| CN | 112003805 A | 11/2020 |
| CN | 113114600 A | 7/2021 |

OTHER PUBLICATIONS

Guixian Cheng; Carrier Index Differential Chaos Shift Keying Modulation and the Corresponding Simultaneous Wireless Information and Power Transfer Technology; Chinese Doctoral Dissertations Full-text Database, 2019 Xiamen University, No. 422, Siming South Road, Xiamen City, Fujian Province, 361000 China.

*Primary Examiner* — Nader Bolourchi (57) ABSTRACT

A differential chaos shift keying communication method based on hybrid index, including: modulating a transmitted signal based on the hybrid index; and demodulating a received signal based on the hybrid index. The hybrid index is a hybrid index bit, which includes a carrier index bit and a carrier number index bit. This application also provides a system for implementing the differential chaos shift keying communication method, which includes a transmitter and a receiver.

2 Claims, 6 Drawing Sheets

DIFFERENTIAL CHAOS SHIFT KEYING COMMUNICATION METHOD AND SYSTEM BASED ON HYBRID INDEX

CROSS-REFERENCE TO RELATED APPLICATIONS

This application claims the benefit of priority from Chinese Patent Application No. 202110809151.1, filed on Jul. 16, 2021. The content of the aforementioned application, including any intervening amendments thereto, is incorporated herein by reference in its entirety.

TECHNICAL FIELD

This application relates to chaotic communication, and more specifically to a differential chaos shift keying (DCSK) communication method and system based on hybrid index.

BACKGROUND

Currently, with the popularization of various multimedia technologies, the demand for wireless communication has increased sharply, and thus the existing available bandwidth resources are insufficient. Therefore, in order to alleviate the shortage of bandwidth resources and ensure high data transmission rate, it is urgently needed to rationally use bandwidth resources, and improve the utilization rate and symbol transmission rate.

Considering that chaotic signals are intrinsically characterized by broadband spectrum, similarity to noise, long-term unpredictability and high sensitivity to initial conditions, and it is convenient to construct a chaotic broadband communication system, the chaotic signals have a brilliant application prospect in the wireless communication. Differential chaos shift keying (DCSK) communication systems are applicable to wireless communication, such as, wireless personal area network (WPAN) and wireless sensor network (WSN), due to their low power consumption and low hardware complexity.

Regarding the traditional DCSK communication system, the bit transmission time is divided into two time slots respectively for transmission of a reference signal and transmission of a reverse or same-direction signal carrying information bits. The noncoherent chaotic digital modulation technology adopts a transmitted-reference (T-R) scheme to transmit reference signals and other information-carrying signals to a receiving end, which avoids the decision-threshold drift in the chaotic shift keying. However, half of the bit transmission time is consumed to transmit those reference signals without data, leading to poor transmission rate and low energy efficiency. Recently, the index modulation has attracted considerable attention, in which the information transmission is performed by selecting different index numbers. Chinese Patent Publication No. 111756664 A discloses a DCSK modulation and demodulation method and system based on short reference carrier index, in which the carrier index-differential chaos shift keying (CI-DCSK) is combined with a short reference signal, and repetitive signals are introduced on the basis of short reference, reducing the received noise and improving the band transmission rate. However, in this system, the number of activated carriers is fixed, and some subcarriers will remain silent, thus causing a waste of bandwidth resources. In addition, an orthogonal frequency division multiplexing (OFDM) communication system based on the number of carriers has also been proposed. Unfortunately, since the number of activated subcarriers remains unknown and needs to be determined, the loss or redundancy of information bits may occur when the number of activated subcarriers is not correctly determined.

SUMMARY

In order to solve the problems of low spectral efficiency, poor energy efficiency and low data transmission rate in the existing differential chaos shift keying (DCSK) communication systems, the present disclosure provides a DCSK communication method and system based on hybrid index, which has improved energy efficiency, spectral efficiency, data transmission rate and reduced bit error rate (BER).

The technical solutions of the present disclosure are described as follows.

In a first aspect, this application provides a differential chaos shift keying (DCSK) communication method based on hybrid index, comprising:

modulating a transmitted signal based on the hybrid index; and demodulating a received signal based on the hybrid index;

wherein the hybrid index is a hybrid index bit comprising a carrier index bit and a carrier number index bit.

In an embodiment, the transmitted signal is modulated through steps of:

(S1) generating a chaotic signal $c_x$;

setting N+1 subcarriers respectively with a frequency of $f_0, f_1, \ldots, f_N$;

taking the chaotic signal $c_x$ as a reference signal;

subjecting the reference signal to pulse shaping; and carrying a pulse-shaped reference signal with a subcarrier with frequency $f_0$ followed by transmission;

(S2) subjecting the chaotic signal $c_x$ to index selection;

subjecting the chaotic signal $c_x$ to Hilbert transform to obtain a chaotic signal $c_y$; and subjecting the chaotic signal $c_y$ to index selection;

(S3) dividing an initial information bit to obtain an index bit $a_k$ and a modulated bit $b_k$; wherein the index bit $a_k$ is configured to determine selection of a chaotic signal carrying an information bit; and allowing the index bit $a_k$ to act on the chaotic signal $c_x$ and the chaotic signal $c_y$ to obtain a chaotic signal $c_k$; and (S4) subjecting the chaotic signal $c_k$ and the modulated bit $b_k$ to chaotic modulation to obtain a chaotic modulated signal;

subjecting the chaotic modulated signal to pulse shaping to obtain a pulse-shaped chaotic modulated signal; and carrying the pulse-shaped chaotic modulated signal respectively with the subcarriers with frequencies $f_1, \ldots, f_N$ followed by transmission.

In an embodiment, the received signal is demodulated through steps of:

(SA) setting the received signal as r(t), wherein the received signal is the transmitted signal after channel transmission; and t represents the signal time;

dividing the r(t) into signals $r_0(t), r_1(t), \ldots, r_N(t)$ according to subcarrier frequency, wherein the signals $r_0(t), r_1(t), \ldots, r_N(t)$ are respectively in the subcarriers with frequencies $f_0, f_1, \ldots, f_N$;

(SB) subjecting signal $r_0(t)$ to Hilbert transform to obtain a signal $\tilde{r}_0(t)$;

(SC) correlating the signal $r_0(t)$ respectively with the signals $r_1(t), \ldots, r_N(t)$ to obtain a first correlation variable $I_j$, $j=1, 2, \ldots, N$; and correlating the signal $\tilde{r}_0(t)$ respectively with the signals $r_1(t), \ldots, r_N(t)$ to obtain a second correlation variable $\tilde{I}_j$, j=1, 2, ..., N;

(SD) subtracting an absolute value of the second correlation variable $\tilde{I}_j$ from an absolute value of the first correlation variable $I_j$ to obtain a final decision variable $\xi_j$;

(SE) recovering the index bit $a_k$ based on the final decision variable $\xi_j$; and (SF) determining a chaotic signal for subcarrier activation according to the index bit $a_k$;

solving a decision metric for demodulating the modulated bit $b_k$; and obtaining the modulated bit $b_k$ by demodulation according to the decision metric.

In an embodiment, wherein a relationship between the chaotic signal $c_x$ and the chaotic signal $c_y$ is expressed as:

$$\sum_{i=1}^{\beta} c_{x,i} c_{y,i} \approx 0;$$

wherein $\beta$ represents the number of signal sampling points; and i represents an $i^{th}$ sampling point;

letting t represent signal time, and allowing the index bit $a_k$ to act on the subcarrier signal $c_x$ and the chaotic signal $c_y$ to obtain the chaotic signal $c_k$ used by a subcarrier to carry the modulated bit; wherein the chaotic signal $c_k$ at the signal time t is expressed as:

$$c_k(t) = \begin{cases} c_x(t) & a_k = 1 \\ c_y(t) & a_k = 0 \end{cases};$$

wherein $c_x(t)$ represents the chaotic signal at the signal time t; $c_y(t)$ represents the chaotic signal $c_y$ at the signal time t; and $c_k(t)$ represents the chaotic signal $c_y$ at the signal time t;

subjecting the chaotic signal $c_k$ and the modulated bit $b_k$ to chaotic modulation to obtain a chaotic modulated signal $b_k c_k$, wherein the chaotic modulated signal $b_k c_k$ is expressed as follows at the signal time t:

$$b_k c_k(t) = \begin{cases} c_k(t) & b_k = 1 \\ -c_k(t) & b_k = 0 \end{cases};$$

wherein $c_k(t)$ represents the chaotic signal $c_k$ at the signal time t.

In an embodiment, the pulse-shaped reference signal carried by the subcarrier with frequency $f_0$ is expressed as follows at the signal time t:

$$s_1(t) = c_x(t)\cos(2\pi f_0);$$

wherein $f_0$ represents the frequency of the subcarrier; and $s_1(t)$ represents the pulse-shaped reference signal carried by the subcarrier with frequency $f_0$ at the signal time t;

at the signal time t, the pulse-shaped information signal carried by subcarriers with a frequency respectively of $f_1, \ldots, f_N$ is expressed as:

$$s_2(t) = \sum_{k=1}^{N} b_k c_k(t)\cos(2\pi f_k);$$

wherein $s_2(t)$ represents the pulse-shaped information signal carried by the subcarriers with a frequency respectively of $f_1, \ldots, f_N$; N represents the number of the subcarriers with a frequency respectively of $f_1, \ldots, f_N$; and the transmitted signal is expressed as:

$$s(t) = s_1(t) + s_2(t) = c_x(t)\cos(2\pi f_0) + \sum_{k=1}^{N} b_k c_k(t)\cos(2\pi f_k);$$

wherein s(t) represents the transmitted signal of differential chaotic shift keying based on the hybrid index.

In an embodiment, when a chaotic signal used by a $j^{th}$ subcarrier is $c_x$, the first correlation variable $I_j$ is expressed as:

$$I_j = \left(\sum_{i=1}^{\beta} c_{x,i} + n_{0,i}\right)\left(\sum_{i=1}^{\beta} c_{j,i} b_j + n_{j,i}\right)$$

$$\approx b_j \sum_{i=1}^{\beta} c_{x,i}^2 + \underbrace{\sum_{i=1}^{\beta} c_{x,i-\tau_l} n_{j,i} + b_j c_{j,i-\tau_l} n_{0,i}}_{A} + \underbrace{\sum_{i=1}^{\beta} n_{0,i} n_{j,i}}_{B};$$

the second correlation variable $\tilde{I}_j$ is expressed as:

$$\tilde{I}_j = \left(\sum_{i=1}^{\beta} c_{x,i-\tau_l} + \tilde{n}_{0,i}\right)\left(\sum_{i=1}^{\beta} c_{j,i-\tau_l} b_j + n_{j,i}\right) \approx$$

$$\underbrace{b_j \sum_{i=1}^{\beta} c_{y,i} c_{j,i}}_{=0} + \underbrace{\sum_{i=1}^{\beta} c_{y,i} n_{j,i} + b_j c_j \tilde{n}_{0,i}}_{C} + \underbrace{\sum_{i=1}^{\beta} \tilde{n}_{0,i} n_{j,i}}_{D};$$

wherein terms A, B, C and D are noise interference terms; j represents a sequence number of a subcarrier; $\beta$ represents a spreading factor; $n_0$ is an additive white Gaussian noise (AWGN) of the reference signal; $\tilde{n}_0$ is a Hilbert transform of $n^0$; and $n_j$ is an AWGN of the $j^{th}$ subcarrier;

in step (SD), the final decision variables $\xi_j$ is expressed as:

$$\xi_j = |b_j \sum_{i=1}^{\beta} c_{x,i}^2 + A + B| - |C + D|;$$

after ignoring noise interference, the final decision variable $\xi_j$ is expressed as:

$$\xi_j = |b_j \sum_{i=1}^{\beta} c_{x,i}^2|, \xi_j > 0;$$

when the chaotic signal used by the $j^{th}$ subcarrier is $c_y$, the final decision variable $\xi_j$ is expressed as:

$$\xi_j = -|b_j \sum_{i=1}^{\beta} c_{y,i}^2|;$$

a formula for recovering the index bit $a_k$ based on the final decision variable $\xi_j$ is expressed as:

$$a_k = \begin{cases} 1 & \xi_j > 0 \\ 0 & \text{other} \end{cases}, j = 1, \ldots, k, \ldots, N.$$

In an embodiment, in step (SF), according to the index bit $a_k$, the chaotic signal for subcarrier activation is determined as follows:

when the index bit $a_k$ is 0, a chaotic signal used by a subcarrier to carry the modulated bit at the signal time t is $c_y(t)$; the chaotic signal for subcarrier activation is $c_y$; and the decision metric is expressed as:

$$I_{1j} = b_k \sum_{i=1}^{\beta} c_{y,i}^2;$$

when the index bit $a_k$ is 1, a chaotic signal used by a subcarrier to carry the modulated bit at the signal time t is $c_x(t)$; the chaotic signal for subcarrier activation is $c_x$; and the decision metric is expressed as:

$$I_{1j} = b_k \sum_{i=1}^{\beta} c_{x,i}^2;$$

and a demodulation formula for obtaining the modulated bit $b_k$ is expressed as:

$$b_k = \begin{cases} 1 & I_{1j} > 0 \\ 0 & \text{other} \end{cases}, j = 1, \ldots, k, \ldots, N.$$

In a second aspect, this application provides a system for implementing the differential chaos shift keying communication method based on hybrid index, comprising:
a transmitter configured to transmit and modulate a signal; and
a receiver configured to receive and demodulate the signal transmitted by the transmitter.

In an embodiment, the transmitter comprises:
a chaotic signal generator;
a first Hilbert filter;
an index selector;
a bit splitter;
a chaotic modulator;
N+1 pulse shapers;
N+1 carrier multipliers; and
an adder;
wherein the chaotic signal generator is configured to generate a chaotic signal $c_x$;
the first Hilbert transformer is configured to perform Hilbert transform on the chaotic signal $c_x$ to obtain a chaotic signal $c_y$;
the index selector is configured to perform index selection on the chaotic signal $c_x$ and the chaotic signal $c_y$;
the bit splitter is configured to split an initial information bit to obtain an index bit $a_k$ and a modulated bit $b_k$; wherein the index bit $a_k$ is input into the index selector to act on the chaotic signal $c_x$ and the chaotic signal $c_y$ to obtain a chaotic signal $c_k$ used by a subcarrier to carry the modulated bit;

the chaotic modulator is configured to perform chaotic modulation on the chaotic signal $c_k$ and the modulated bit $b_k$ to obtain N chaotic modulated signals;
the N+1 pulse shapers are configured to perform pulse shaping on the N chaotic modulated signals and the chaotic signal $c_x$;
the N+1 carrier multipliers are configured to multiply N subcarriers with a frequency respectively of $f_1, \ldots, f_N$ respectively by N pulse-shaped chaotic modulated signals, and multiply a subcarrier with a frequency of $f_0$ by pulse-shaped chaotic signal $c_x$;
the adder is configured to collect and transmit pulse-shaped signals carried by subcarriers with frequencies $f_0, f_1, \ldots, f_N$ corresponding to the N+1 carrier multipliers.

In an embodiment, the receiver is configured to demodulate a signal transmitted by the transmitter; let the signal transmitted by the transmitter be r(t), and t represents a signal time.

In an embodiment, the receiver comprises:
N+1 matched filters;
a second Hilbert filter;
a first correlator;
a second correlator;
a decision variable calculator;
a threshold decision device; and
a demodulator;
wherein the N+1 matched filters are configured to separate the signal into N+1 subcarriers with frequencies $f_0, f_1, \ldots, f_N$ to obtain a signal $r_0(t)$ in the subcarrier with frequency $f_0$ and signals $r_1(t), \ldots, r_N(t)$ in subcarriers with frequencies $f_1, \ldots, f_N$;
the second Hilbert transformer is configured to perform Hilbert transform on the signal $r_0(t)$ to obtain a signal $\tilde{r}_0(t)$;
the first correlator is configured to correlate the signal $r_0(t)$ respectively with the signals $r_1(t), \ldots, r_N(t)$ to obtain a first correlation variable $I_j$, j=1, 2, $\ldots$, N;
the second correlator is configured to correlate the signal $\tilde{r}_0(t)$ respectively with the signals $r_1(t), \ldots, r_N(t)$ to obtain a second correlation variable $\tilde{I}_j$, j=1, 2, $\ldots$, N;
the decision variable calculator is configured to subtract an absolute value of the second correlation variable $\tilde{I}_j$ from an absolute value of the first correlation variable $I_j$ to obtain a final decision variable $\xi_j$;
the threshold decision device is configured to recover the index bit $a_k$ according to the final decision variable $\xi_j$; and
the demodulator is configured to determine a chaotic signal used for subcarrier activation according to the index bit $a_k$, solve a decision metric for demodulating the modulated bit $b_k$; and obtain the modulated bit $b_k$ by demodulation according to the decision metric.

Compared to the prior art, the present disclosure has the following beneficial effects.

The present disclosure provides a differential chaos shift keying communication method based on hybrid index, which includes modulating a transmitted signal based on the hybrid index and demodulating a received signal based on the hybrid index. The hybrid index is a hybrid index bit, which includes a carrier index bit and a carrier number index bit. Coordination of the modulation and demodulation under the hybrid index has a higher energy efficiency and spectral efficiency than a DCSK with carrier index communication method, and has a lower bit error rate compared with a multi-carrier DCSK communication method, that is, the energy efficiency, spectral efficiency and bit error rate are comprehensively improved.

DETAILED DESCRIPTION OF EMBODIMENTS

The technical solutions of the present disclosure will be described completely and clearly below with reference to the accompanying drawings and embodiments. Obviously, the drawings are merely illustrative, and are not intended to limit the disclosure. It should be understood that some well-known contents in the accompanying drawings may be omitted, and all other embodiments obtained by those skilled in the art based on the content disclosed herein without paying any creative effort shall fall within the scope of the present disclosure.

Embodiment 1

Figure 1:
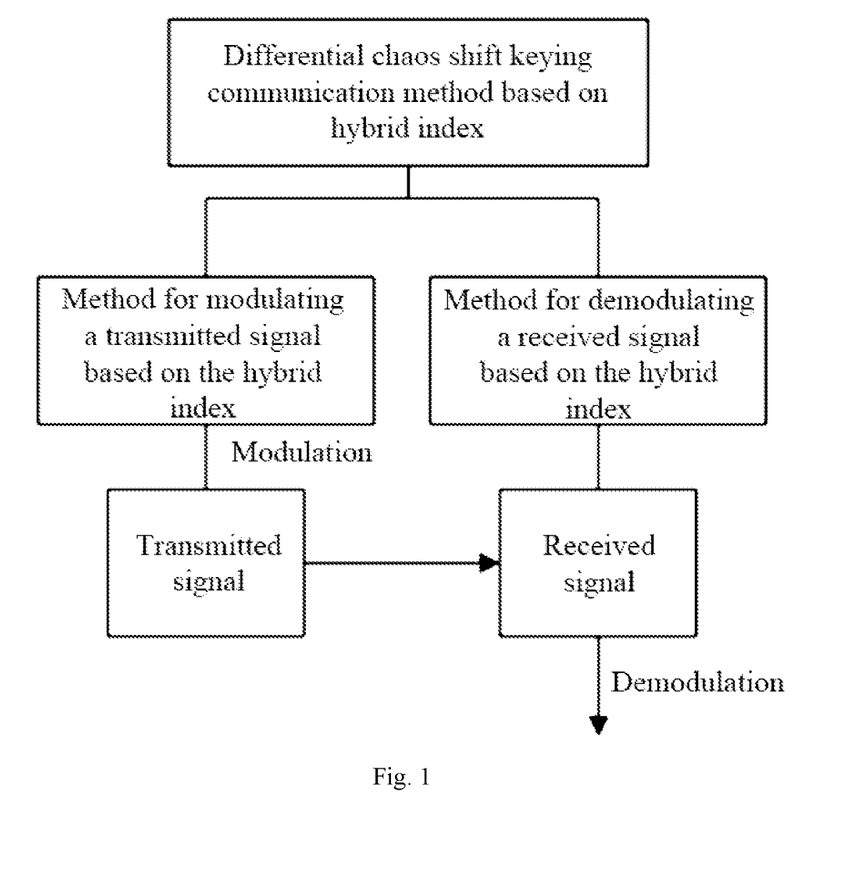
FIG. 1 is a flow chart of a differential chaos shift keying (DCSK) communication method based on hybrid index according to an embodiment of the present disclosure.

As shown in FIG. 1, a differential chaos shift keying communication method based on hybrid index includes: modulating a transmitted signal based on the hybrid index and demodulating a received signal based on the hybrid index. The hybrid index is a hybrid index bit, which includes a carrier index bit and a carrier number index bit.

Specifically, the transmitted signal is modulated through the following steps.

(S1) A chaotic signal $c_x$ is generated. N+1 subcarriers respectively with a frequency of $f_0, f_1, \ldots, f_N$ are set. The chaotic signal $c_x$ is taken as a reference signal. The reference signal is performed pulse shaping. The reference signal is subjected to pulse-shaping. A pulse-shaped reference signal is carried with a subcarrier with frequency $f_0$ followed by transmission.

(S2) The chaotic signal $c_x$ is subjected to index selection.

The chaotic signal $c_x$ is subjected to Hilbert transform to obtain a chaotic signal $c_y$.

The chaotic signal $c_y$ is performed index selection.

(S3) An initial information bit is divided to obtain an index bit $a_k$ and a modulated bit $b_k$. The index bit $a_k$ is configured to determine selection of a chaotic signal carrying an information bit.

The index bit $a_k$ is allowed to act on the chaotic signal $c_x$ and the chaotic signal $c_y$ to obtain a chaotic signal $c_k$.

(S4) The chaotic signal $c_k$ and the modulated bit $b_k$ are subjected to chaotic modulation to obtain a chaotic modulated signal.

The chaotic modulated signal is subjected to pulse shaping to obtain a pulse-shaped chaotic modulated signal.

The pulse-shaped chaotic modulated signal is respectively carried with the subcarriers with frequencies $f_1, \ldots, f_N$ followed by transmission.

The received signal is demodulated through the following steps.

(SA) The received signal is set as r(t), where the received signal is the transmitted signal after channel transmission; and t represents the signal time.

The r(t) is divided into signals $r_0(t), r_1(t), \ldots, r_N(t)$ according to subcarrier frequency, where the signals $r_0(t), r_1(t), \ldots, r_N(t)$ are respectively in the subcarriers with frequencies $f_0, f_1, \ldots, f_N$.

(SB) The signal $r_0(t)$ is subjected to Hilbert transform to obtain a signal $\tilde{r}_0(t)$.

(SC) The signal $r_0(t)$ is respectively correlated with the signals $r_1(t), \ldots, r_N(t)$ to obtain a first correlation variable $I_j$, j=1, 2, ..., N.

The signal $\tilde{r}_0(t)$ is respectively correlated with the signals $r_1(t), \ldots, r_N(t)$ to obtain a second correlation variable $\tilde{I}_j$, j=1, 2, ..., N.

(SD) An absolute value of the second correlation variable $\tilde{I}_j$ is subtracted from an absolute value of the first correlation variable $I_j$ to obtain a final decision variable $\xi_j$.

(SE) The index bit $a_k$ is recovered based on the final decision variable $\xi_j$.

(SF) A chaotic signal for subcarrier activation is determined according to the index bit $a_k$.

A decision metric for demodulating the modulated bit $b_k$ is solved.

The modulated bit $b_k$ is obtained by demodulation according to the decision metric.

In an embodiment, a relationship between the chaotic signal $c_x$ and the chaotic signal $c_y$ is expressed as:

$$\sum_{i=1}^{\beta} c_{x,i} c_{y,i} \approx 0;$$

where $\beta$ represents the number of signal sampling points; and i represents an $i^{th}$ sampling point.

Let t represent signal time, and the index bit $a_k$ is allowed to act on the chaotic signal $c_x$ and the chaotic signal $c_y$ to obtain the chaotic signal $c_k$ used by a subcarrier to carry the modulated bit. The chaotic signal $c_k$ at the signal time t is expressed as:

$$c_k(t) = \begin{cases} c_x(t) & a_k = 1 \\ c_y(t) & a_k = 0 \end{cases};$$

where $c_x(t)$ represents the chaotic signal at the signal time t; $c_y(t)$ represents the chaotic signal $c_y$ at the signal time t; and $c_k(t)$ represents the chaotic signal $c_y$ at the signal time t.

The chaotic signal $c_k$ and the modulated bit $b_k$ are subjected to chaotic modulation to obtain a chaotic modulated signal $b_k c_k$, where the chaotic modulated signal $b_k c_k$ is expressed as follows at the signal time t:

$$b_k c_k(t) = \begin{cases} c_k(t) & b_k = 1 \\ -c_k(t) & b_k = 0 \end{cases};$$

where $c_k(t)$ represents the chaotic signal $c_k$ at the signal time t.

In an embodiment, the pulse-shaped reference signal carried by the subcarrier with frequency $f_0$ is expressed as follows at the signal time t:

$$s_1(t) = c_x(t)\cos(2\pi f_0);$$

where $f_0$ represents the frequency of the subcarrier; and $s_1(t)$ represents the pulse-shaped reference signal carried by the subcarrier with frequency $f_0$ at the signal time t.

At the signal time t, the pulse-shaped signal information carried by the subcarriers with a frequency respectively of $f_1, \ldots, f_N$ is expressed as:

$$s_2(t) = \sum_{k=1}^{N} b_k c_k(t)\cos(2\pi f_k);$$

where $s_2(t)$ represents the pulse-shaped information signal carried by the subcarriers with a frequency respectively of $f_1, \ldots, f_N$; N represents the number of the subcarriers with a frequency respectively of $f_1, \ldots, f_N$.

The transmitted signal is expressed as:

$$s(t) = s_1(t) + s_2(t) = c_x(t)\cos(2\pi f_0) + \sum_{k=1}^{N} b_k c_k(t)\cos(2\pi f_k);$$

where s(t) represents the transmitted signal of differential chaotic shift keying based on the hybrid index.

In an embodiment, when a chaotic signal used by a $j^{th}$ subcarrier is $c_x$, the first correlation variable is expressed as:

$$I_j = \left(\sum_{i=1}^{\beta} c_{x,i} + n_{0,i}\right)\left(\sum_{i=1}^{\beta} c_{j,i} b_j + n_{j,i}\right) \approx$$

$$b_j \sum_{i=1}^{\beta} c_{x,i}^2 + \underbrace{\sum_{i=1}^{\beta} c_{x,i-\tau_l} n_{j,i} + b_j c_{j,i-\tau_l} n_{0,i}}_{A} + \underbrace{\sum_{i=1}^{\beta} n_{0,i} n_{j,i}}_{B};$$

the second correlation variable $\tilde{I}_j$ is expressed as:

$$\tilde{I}_j = \left(\sum_{i=1}^{\beta} c_{x,i-\tau_l} + \tilde{n}_{0,i}\right)\left(\sum_{i=1}^{\beta} c_{j,i-\tau_l} b_j + n_{j,i}\right) \approx$$

$$\underbrace{b_j \sum_{i=1}^{\beta} c_{y,i} c_{j,i}}_{=0} + \underbrace{\sum_{i=1}^{\beta} c_{y,i} n_{j,i} + b_j c_j \tilde{n}_{0,i}}_{C} + \underbrace{\sum_{i=1}^{\beta} \tilde{n}_{0,i} n_{j,i}}_{D};$$

where terms A, B, C and D are noise interference terms; j represents a sequence number of a subcarrier; β represents a spreading factor; $n_0$ is an additive white Gaussian noise (AWGN) of the reference signal; $\tilde{n}_0$ is a Hilbert transform of $n_0$; and $n_j$ is an AWGN of the subcarrier.

In step (SD), the final decision variables $\xi_j$ is expressed as:

$$\xi_j = \left|b_j \sum_{i=1}^{\beta} c_{x,i}^2 + A + B\right| - |C + D|.$$

After the noise interference is ignored, the final decision variable $\xi_j$ is expressed as:

$$\xi_j = \left|b_j \sum_{i=1}^{\beta} c_{x,i}^2\right|, \xi_j > 0.$$

When the chaotic signal used by the $j^{th}$ subcarrier is $c_y$, the final decision variable $\xi_j$ is expressed as:

$$\xi_j = -\left|b_j \sum_{i=1}^{\beta} c_{y,i}^2\right|.$$

A formula for recovering the index bit $a_k$ based on the final decision variable $\xi_j$ is expressed as:

$$a_k = \begin{cases} 1 & \xi_j > 0 \\ 0 & \text{other} \end{cases}, j = 1, \ldots, k, \ldots, N.$$

In step (SF), according to the index bit $a_k$, the chaotic signal for subcarrier activation is determined as follows.

When the index bit $a_k$ is 0, a chaotic signal used by a subcarrier to carry the modulated bit at the signal time t is $c_y(t)$; the chaotic signal for subcarrier activation is $c_y$; and the decision metric is expressed as:

$$I_{1j} = b_k \sum_{i=1}^{\beta} c_{y,i}^2.$$

When the index bit $a_k$ is 1, a chaotic signal used by a subcarrier to carry the modulated bit at the signal time t is $c_x(t)$; the chaotic signal for subcarrier activation is $c_x$; and the decision metric is expressed as:

$$I_{1j} = b_k \sum_{i=1}^{\beta} c_{x,i}^2.$$

A demodulation formula for obtaining the modulated bit $b_k$ is expressed as:

$$b_k = \begin{cases} 1 & I_{1j} > 0 \\ 0 & \text{other} \end{cases}, j = 1, \ldots, k, \ldots, N.$$

This application also provides a system for implementing the differential chaos shift keying communication method based on hybrid index, which includes a transmitter configured to transmit and modulate a signal and a receiver configured to receive and demodulate the signal transmitted by the transmitter.

Figure 2:
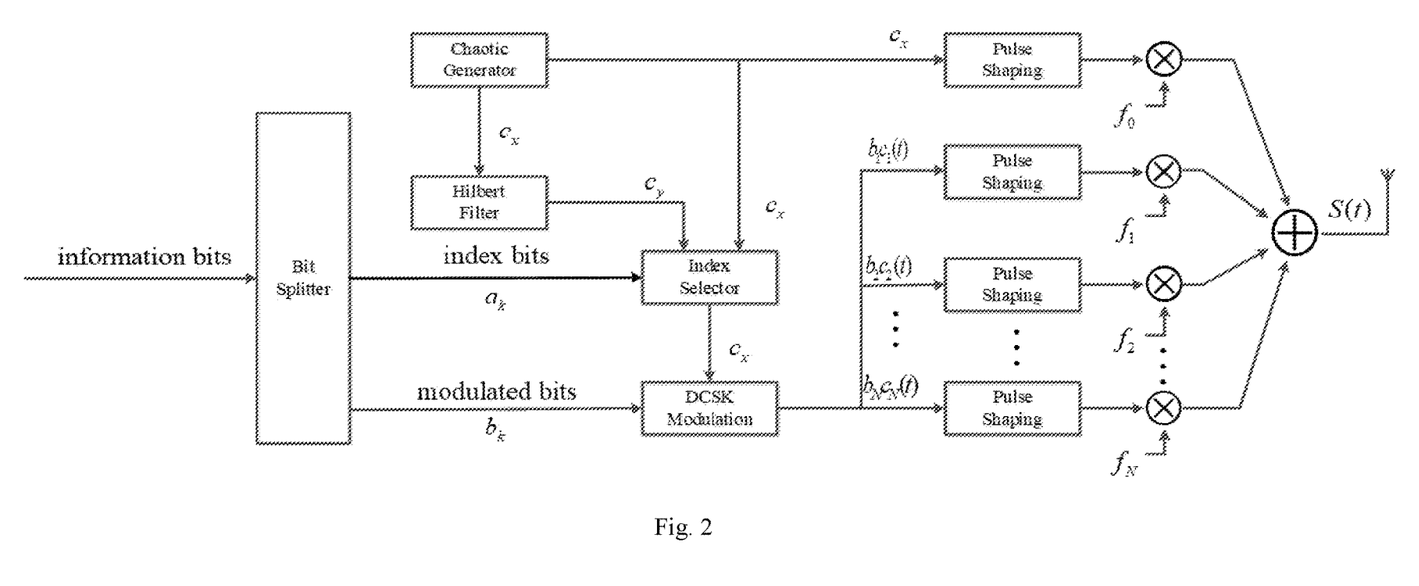
FIG. 2 is s block diagram of a transmitter of a DCSK communication system based on hybrid index according to an embodiment of the present disclosure.

As shown in FIG. 2, the transmitter includes: a chaotic signal generator, a first Hilbert filter, an index selector, a bit splitter, a chaotic modulator, N+1 pulse shapers, N+1 carrier multipliers and an adder. The chaotic signal generator is configured to generate a chaotic signal $c_x$. The first Hilbert transformer is configured to perform Hilbert transform on the chaotic signal $c_x$ to obtain a chaotic signal $c_y$. The index selector is configured to perform index selection on the chaotic signal $c_x$ and chaotic signal $c_y$. The bit splitter is configured to split an initial information bit to obtain an index bit $a_k$ and a modulated bit $b_k$; wherein the index bit $a_k$ is allowed to act on the chaotic signal $c_x$ and the chaotic signal $c_y$ to obtain a chaotic signal $c_k$ used by a subcarrier to carry the modulated bit. The chaotic modulator is configured to perform chaotic modulation on the chaotic signal $c_k$ and the modulated bit $b_k$ to obtain N chaotic modulated signals. The N+1 pulse shapers are configured to perform pulse shaping on the N chaotic modulated signals and the chaotic signal $c_x$. The N+1 carrier multipliers are configured to multiply N subcarriers with a frequency respectively of $f_1, \ldots, f_N$ respectively by N pulse-shaped chaotic modulated signals, and multiply a subcarrier with a frequency of $f_0$ by pulse-shaped chaotic signal $c_x$. The adder is configured to collect and transmit pulse-shaped signals carried by subcarriers with frequencies $f_0, f_1, \ldots, f_N$ corresponding to the N+1 carrier multipliers.

Figure 3:
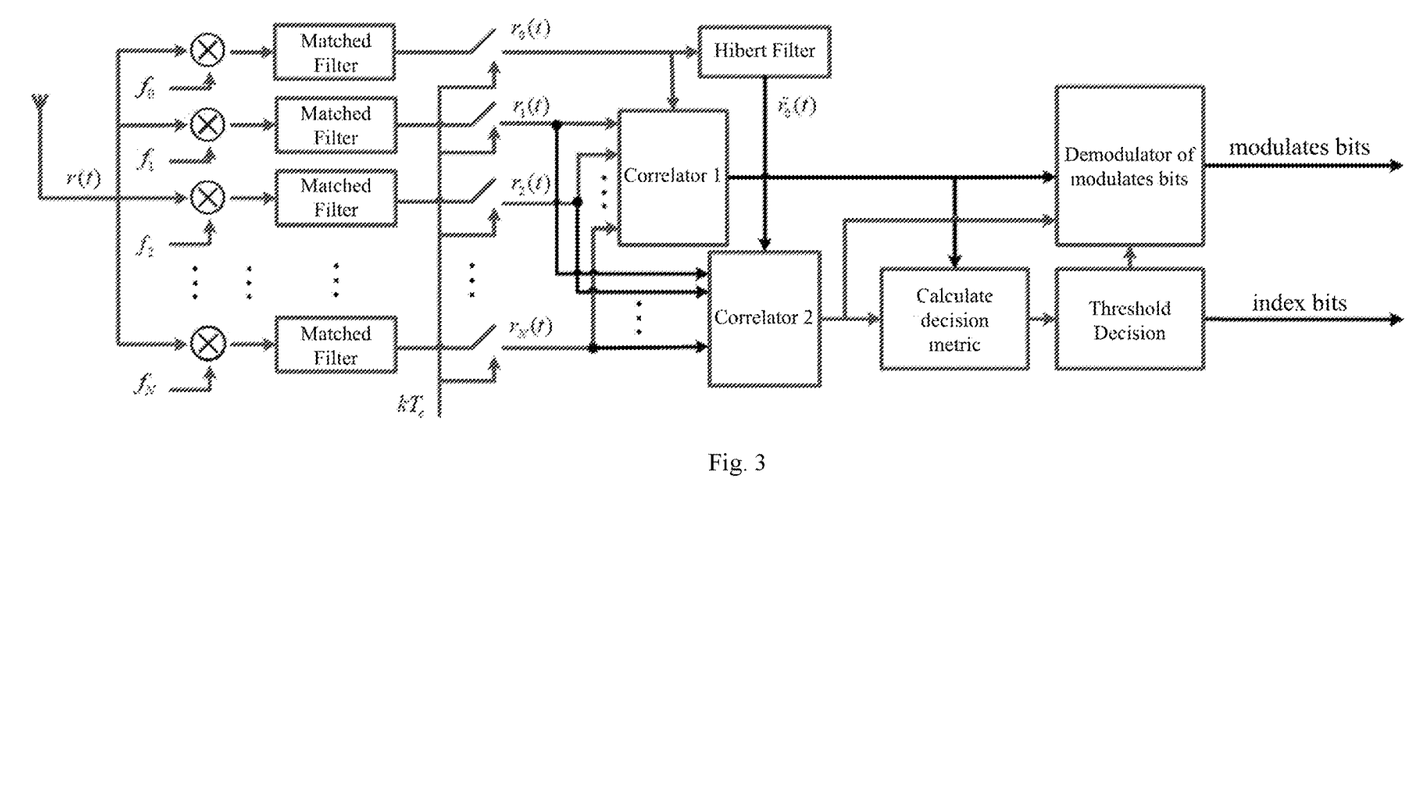
FIG. 3 is block diagram of a receiver of the DCSK communication system according to an embodiment of the present disclosure.

As shown in FIG. 3, the receiver is configured to demodulate a signal transmitted by the transmitter; the signal transmitted by the transmitter is represented by r(t), and t represents a signal time.

The receiver includes N+1 matched filters, a second Hilbert filter; a first correlator, a second correlator, a decision variable calculator, a threshold decision device and a demodulator. The N+1 matched filters are configured to separate the signal into N+1 subcarriers with frequencies $f_0$, $f_1, \ldots, f_N$ to obtain a signal $r_0(t)$ in the subcarrier with frequency $f_0$ and signals $r_1(t), \ldots, r_N(t)$ in subcarriers with frequencies $f_1, \ldots, f_N$. The second Hilbert transformer is configured to perform Hilbert transform on the signal $r_0(t)$ to obtain a signal $\tilde{r}_0(t)$. The first correlator is configured to correlate the signal $r_0(t)$ respectively with the signals $r_1(t), \ldots, r_N(t)$ to obtain a first correlation variable $I_j$, j=1, 2, ..., N. The second correlator is configured to correlate the signal $\tilde{r}_0(t)$ respectively with the signals $r_1(t), \ldots, r_N(t)$ to obtain a second correlation variable $\tilde{I}_j$, j=1, 2, ..., N. The decision variable calculator is configured to subtract an absolute value of the second correlation variable $\tilde{I}_j$ from an absolute value of the first correlation variable $I_j$ to obtain a final decision variable $\xi_j$. The threshold decision device is configured to recover the index bit $a_k$ according to the final decision variable $\xi_j$. The demodulator is configured to determine a chaotic signal used for subcarrier activation according to the index bit $a_k$, solve a decision metric for demodulating the modulated bit $b_k$; and obtain the modulated bit $b_k$ by demodulation according to the decision metric.

Figure 4:
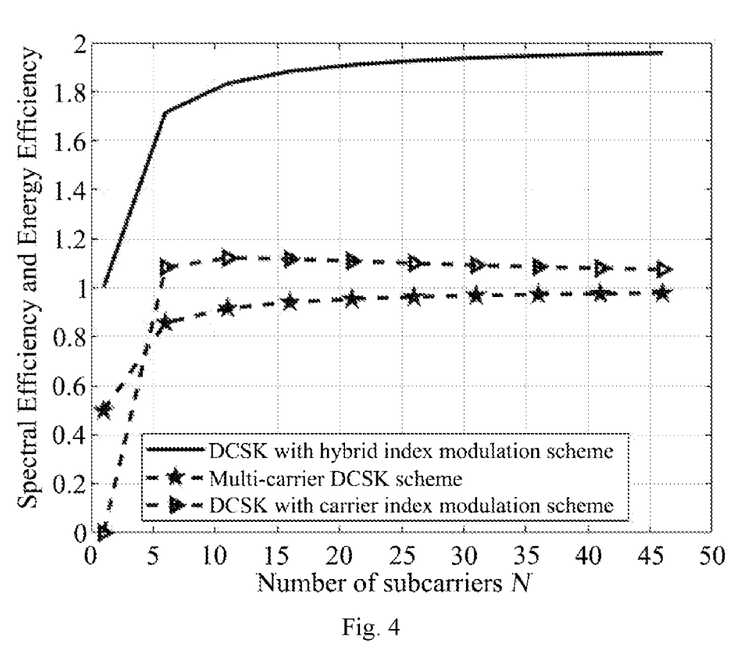
FIG. 4 illustrates comparison among the DCSK communication method according to an embodiment of the disclosure, carrier index DCSK modulation and multi-carrier DCSK modulation scheme in spectral efficiency and energy efficiency.

In order to further verify the validity of the method of the present disclosure, specific simulation effect diagrams will be described below. FIG. 4 shows a contrast graph of the method provided in the present disclosure, DCSK with carrier index modulation scheme and multi-carrier DCSK modulation scheme in spectrum efficiency and energy efficiency. A smooth line represents a mark of the method in the present disclosure. ▲ is a mark of the DCSK with carrier index modulation method. ★ is a mark of the multi-carrier DCSK modulation method. It can be concluded that the method and system in the present disclosure has great advantages in terms of spectral efficiency and energy efficiency compared with the DCSK with carrier index modulation and multi-carrier DCSK modulation. When the number of carriers is large, the spectral efficiency and the energy efficiency of the method in the present disclosure are about twice as high as those of other methods.

Figure 5:
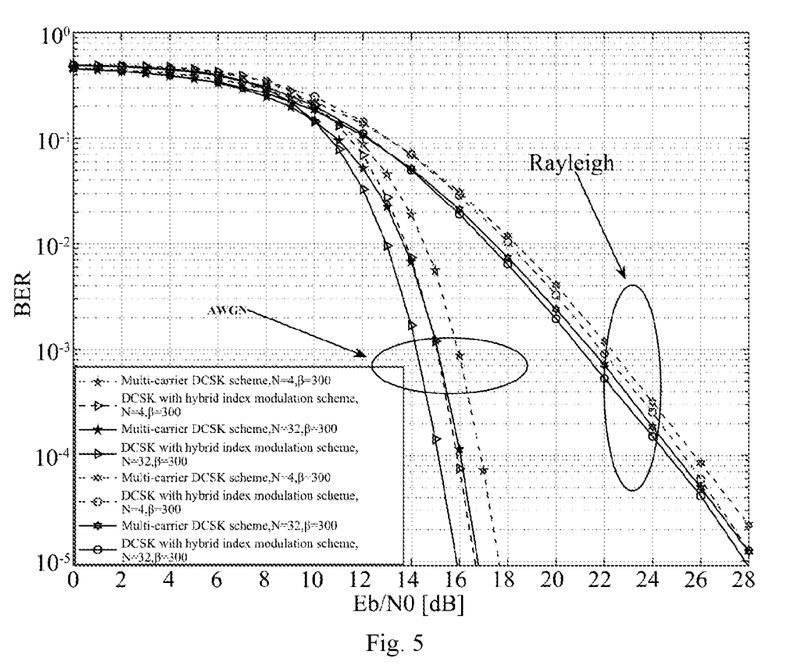
FIG. 5 illustrates comparison between the DCSK communication method according to an embodiment of the disclosure and the multi-carrier DCSK modulation in bit error rate under a Gaussian channel and a multi-path Rayleigh fading channel.
Figure 6:
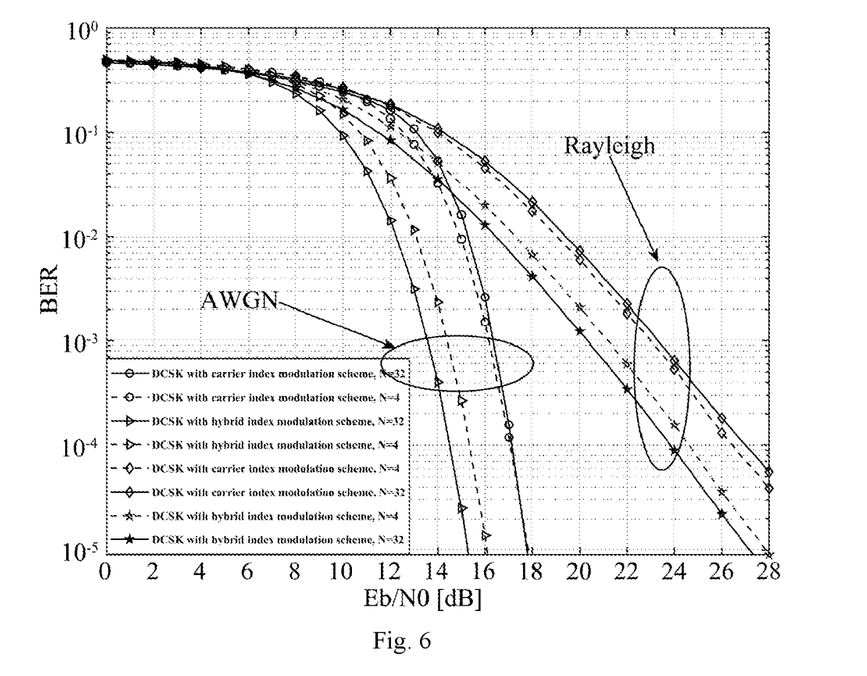
FIG. 6 shows comparison between the DCSK communication method according to an embodiment of the disclosure and single-carrier index DCSK modulation in terms of bit error rate under the Gaussian channel and multi-path Rayleigh fading channel.

FIG. 5 shows a contrast graph of the method provided in the present disclosure and the multi-carrier DCSK modulation scheme in bit error rate under a Gaussian channel and a multi-path Rayleigh fading channel. FIG. 6 shows cases that the number of carriers N is equal to 4, spreading factor β is equal to 300, and the number of paths L is equal to 3; and the number of carriers N is equal to 32, spreading factor β is equal to 300, and the number of paths L is equal to 3, with an average power gain $E(\lambda_1^2)=E(\lambda_2^2)=E(\lambda_3^2)=\frac{1}{3}$, delay $\tau_1=0, \tau_2=2, \tau_3=4$. Under the Gaussian channel, when the number of carriers is equal to 4 and the bit error rate is $10^{-5}$, the method in the present disclosure has a performance gain of 1 dB compared with the multi-carrier DCSK system. Under the multi-path Rayleigh fading channel, the method in the present disclosure also has a lower bit error rate.

FIG. 6 shows a contrast graph of the method provided in the present disclosure and the DCSK with carrier index modulation scheme in bit error rate under the Gaussian channel and the multi-path Rayleigh fading channel. FIG. 6 shows cases that the number of carriers N is equal to 4, spreading factor β is equal to 300 and the number of paths L is equal to 3, and the number of carriers N is equal to 32, spreading factor β is equal to 300 and the number of paths L is equal to 3, and with an average power gain $E(\lambda_1^2)=E(\lambda_2^2)=E(\lambda_3^2)=\frac{1}{3}$, delay $\tau_1=0, \tau_2=2, \tau_3=4$. Under the Gaussian channel, when the number of carriers N is equal to 4, and the bit error rate is equal to $10^{-5}$, the method of the present disclosure has a performance gain of 1-2 dB compared with the DCSK with carrier index modulation scheme; and when the number of the carriers is equal to 32, and the bit error rate is equal to $10^{-5}$, the advantage is further expanded. Compared with the DCSK system with carrier index, the method of the present disclosure has a performance gain of 2-3 dB. Under the multi-path Rayleigh fading channel, when there are 32 carriers, and the-bit error rate is equal to $10^{-5}$, the method provided herein has a performance gain of 3 dB.

Described above are only preferred embodiments of the present disclosure and are not intended to limit the present disclosure. It should be understood that any modifications, replacements and improvements made by those skilled in the art without departing from the spirit and scope of the present disclosure should fall within the scope of the present disclosure defined by the appended claims.

What is claimed is:
1. A differential chaos shift keying communication method based on hybrid index, comprising:
modulating a transmitted signal based on the hybrid index; and
demodulating a received signal based on the hybrid index;
wherein the hybrid index is a hybrid index bit comprising a carrier index bit and a carrier number index bit;
the transmitted signal is modulated through steps of:
(S1) generating a chaotic signal $c_x$;
setting N+1 subcarriers respectively with frequencies of $f_0, f_1, \ldots, f_N$;
taking the chaotic signal $c_x$ as a reference signal;
subjecting the reference signal to pulse shaping; and
carrying a pulse-shaped reference signal with a subcarrier with frequency $f_0$ followed by transmission;
(S2) subjecting the chaotic signal $c_x$ to index selection;
subjecting the chaotic signal $c_x$ to Hilbert transform to obtain a chaotic signal $c_y$; and
subjecting the chaotic signal $c_y$ to index selection;

wherein a relationship between the chaotic signal $c_x$ and the chaotic signal $c_y$ is expressed as:

$$\sum_{i=1}^{\beta} c_{x,i} c_{y,i} \approx 0;$$

wherein $\beta$ represents the number of signal sampling points; and i represents an $i^{th}$ sampling point;

letting t represent signal time, and allowing an index bit $a_k$ to act on the chaotic signal $c_x$ and the chaotic signal $c_y$ to obtain a chaotic signal $c_k$ used by a subcarrier with frequency $f_k$ to carry a modulated bit $b_k$; wherein the chaotic signal $c_k$ at a signal time t is expressed as:

$$c_k(t) = \begin{cases} c_x(t) & a_k = 1 \\ c_y(t) & a_k = 0 \end{cases};$$

wherein $c_x(t)$ represents the chaotic signal $c_x$ at the signal time t; $c_y(t)$ represents the chaotic signal $c_y$ at the signal time t; and $c_k(t)$ represents the chaotic signal $c_k$ at the signal time t;

subjecting the chaotic signal $c_k$ and the modulated bit $b_k$ to chaotic modulation to obtain a chaotic modulated signal $b_k c_k$, wherein the chaotic modulated signal $b_k c_k$ is expressed as follows at the signal time t:

$$b_k c_k(t) = \begin{cases} c_k(t) & b_k = 1 \\ -c_k(t) & b_k = 0 \end{cases};$$

the pulse-shaped reference signal carried by the subcarrier with frequency $f_0$ is expressed as follows at the signal time t:

$$s_1(t) = c_x(t) \cos(2\pi f_0);$$

wherein $s_1(t)$ represents the pulse-shaped reference signal carried by the subcarrier with frequency $f_0$ at the signal time t;

at the signal time t, a pulse-shaped information signal carried by the subcarriers respectively with the frequencies of $f_1, \ldots, f_N$ is expressed as:

$$s_2(t) = \sum_{k=1}^{N} b_k c_k(t) \cos(2\pi f_k);$$

wherein $s_2(t)$ represents the pulse-shaped information signal carried by the subcarriers respectively with the frequencies of $f_1, \ldots, f_N$; N represents the number of the subcarriers respectively with the frequencies of $f_1, \ldots, f_N$; and the transmitted signal is expressed as:

$$s(t) = s_1(t) + s_2(t) = c_x(t)\cos(2\pi f_0) + \sum_{k=1}^{N} b_k c_k(t) \cos(2\pi f_k);$$

(S3) determining, by the index bit $a_k$, selection of a chaotic signal carrying an information bit; and (S4) subjecting the chaotic modulated signal to pulse shaping to obtain a pulse-shaped chaotic modulated signal; and carrying the pulse-shaped chaotic modulated signal respectively with the subcarriers with frequencies $f_1, \ldots, f_N$ followed by transmission;

the received signal is demodulated through steps of:

(SA) setting the received signal as r(t), wherein the received signal is the transmitted signal after channel transmission; and t represents the signal time;

dividing the r(t) into signals $r_0(t), r_1(t), \ldots, r_N(t)$ according to the subcarriers frequencies, wherein the signals $r_0(t), r_1(t), \ldots, r_N(t)$ are in the subcarriers respectively with the frequencies of $f_0, f_1, \ldots, f_N$;

(SB) subjecting signal $r_0(t)$ to Hilbert transform to obtain a signal $\tilde{r}_0(t)$;

(SC) correlating the signal $r_0(t)$ respectively with the signals $r_1(t), \ldots, r_N(t)$ to obtain a first correlation variable $I_j$, j=1, 2, ..., N; and correlating the signal $\tilde{r}_0(t)$ respectively with the signals $r_1(t), \ldots, r_N(t)$ to obtain a second correlation variable $\tilde{I}_j$, j=1, 2, ..., N;

(SD) subtracting an absolute value of the second correlation variable $\tilde{I}_j$ from an absolute value of the first correlation variable $I_j$ to obtain a final decision variable $\xi_j$;

(SE) recovering the index bit $a_k$ based on the final decision variable $\xi_j$; and (SF) determining a chaotic signal for subcarrier activation according to the index bit $a_k$;

solving a decision metric for demodulating the modulated bit $b_k$; and obtaining the modulated bit $b_k$ by demodulation according to the decision metric;

when a chaotic signal used by a $j^{th}$ subcarrier is $c_x$, the first correlation variable $I_j$ is expressed as:

$$I_j = \left(\sum_{i=1}^{\beta} c_{x,i} + n_{0,i}\right)\left(\sum_{i=1}^{\beta} c_{j,i} b_j + n_{j,i}\right) \approx$$

$$b_j \sum_{i=1}^{\beta} c_{x,i}^2 + \underbrace{\sum_{i=1}^{\beta} c_{x,i-\tau_l} n_{j,i} + b_j c_{j,i-\tau_l} n_{0,i}}_{A} + \underbrace{\sum_{i=1}^{\beta} n_{0,1} n_{j,i}}_{B};$$

the second correlation variable $\tilde{I}_j$ is expressed as:

$$\tilde{I}_j = \left(\sum_{i=1}^{\beta} c_{x,i-\tau_l} + \tilde{n}_{0,i}\right)\left(\sum_{i=1}^{\beta} c_{j,i-\tau_l} b_j + n_{j,i}\right) \approx$$

$$\underbrace{b_j \sum_{i=1}^{\beta} c_{y,i} c_{j,i}}_{=0} + \underbrace{\sum_{i=1}^{\beta} c_{y,i} n_{j,i} + b_j c_j \tilde{n}_{0,i}}_{C} + \underbrace{\sum_{i=1}^{\beta} \tilde{n}_{0,i} n_{j,i}}_{D};$$

wherein terms A, B, C and D are noise interference terms; $\beta$ represents a spreading factor; $n_0$ is an additive white Gaussian noise (AWGN) of the reference signal; $\tilde{n}_0$ Hilbert transform of $n_0$; $n_0$ and $n_j$ is an AWGN of the $j^{th}$ subcarrier;

in step (SD), the final decision variable $\xi_j$ is expressed as:

$$\xi_j = \left|b_j \sum_{i=1}^{\beta} c_{x,i}^2 + A + B\right| - |C + D|;$$

after ignoring noise interference, the final decision variable $\xi_j$ is expressed as:

$$\xi_j = \left| b_j \sum_{i=1}^{\beta} c_{x,i}^2 \right|, \xi_j > 0;$$

when the chaotic signal used by the $j^{th}$ subcarrier is $c_y$, the final decision variable $\xi_j$ is expressed as:

$$\xi_j = -\left| b_j \sum_{i=1}^{\beta} c_{y,i}^2 \right|;$$

a formula for recovering the index bit $a_k$ based on the final decision variable $\xi_j$ is expressed as:

$$a_k = \begin{cases} 1 & \xi_j > 0 \\ 0 & \text{other} \end{cases}, j = 1, \ldots, k, \ldots, N;$$

in step (SF), according to the index bit $a_k$, the chaotic signal for subcarrier activation is determined as follows:

when the index bit $a_k$ is 0, a chaotic signal used by a subcarrier to carry the modulated bit at the signal time t is $c_y(t)$; the chaotic signal for subcarrier activation is $c_y$; and the decision metric is expressed as:

$$I_{1j} = b_k \sum_{i=1}^{\beta} c_{y,i}^2;$$

when the index bit $a_k$ is 1, a chaotic signal used by a subcarrier to carry the modulated bit at the signal time t is $c_x(t)$; the chaotic signal for subcarrier activation is $c_x$; and the decision metric is expressed as:

$$I_{1j} = b_k \sum_{i=1}^{\beta} c_{x,i}^2;$$

and
a demodulation formula for obtaining the modulated bit $b_k$ is expressed as:

$$b_k = \begin{cases} 1 & I_{1j} > 0 \\ 0 & \text{other} \end{cases}, j = 1, \ldots, k, \ldots, N.$$

2. A system for implementing the differential chaos shift keying communication method of claim 1, comprising:
a transmitter configured to transmit and modulate a signal; and
a receiver configured to receive and demodulate the signal transmitted by the transmitter;
wherein the transmitter comprises:
a chaotic signal generator;
a first Hilbert filter;
an index selector;
a bit splitter;
a chaotic modulator;
N+1 pulse shapers;
N+1 carrier multipliers; and
an adder;
wherein the chaotic signal generator is configured to generate the chaotic signal $c_x$;
the first Hilbert transformer is configured to perform Hilbert transform on the chaotic signal $c_x$ to obtain the chaotic signal $c_y$;
the index selector is configured to perform the index selection on the chaotic signal $c_x$ and the chaotic signal $c_y$;
the bit splitter is configured to split an initial information bit to obtain the index bit $a_k$ and the modulated bit $b_k$; wherein the index bit $a_k$ is input into the index selector to act on the chaotic signal $c_x$ and the chaotic signal $c_y$ to obtain the chaotic signal $c_k$ used by the subcarrier with frequency $f_k$ to carry the modulated bit;
the chaotic modulator is configured to perform chaotic modulation on the chaotic signal $c_k$ and the modulated bit $b_k$ to obtain N chaotic modulated signals;
the N+1 pulse shapers are configured to perform the pulse shaping on the N chaotic modulated signals and the chaotic signal $c_x$;
the N+1 carrier multipliers are configured to multiply N subcarriers with a frequency respectively of $f_1, \ldots, f_N$ respectively by N pulse-shaped chaotic modulated signals, and multiply the subcarrier with the frequency of $f_0$ by pulse-shaped chaotic signal $c_x$;
the adder is configured to collect and transmit pulse-shaped signals carried by the N+1 subcarriers with frequencies $f_0, f_1, \ldots, f_N$ corresponding to the N+1 carrier multipliers;
the receiver is configured to demodulate the signal transmitted by the transmitter; let the signal transmitted by the transmitter be r(t), and t represents a signal time;
the receiver comprises:
N+1 matched filters;
a second Hilbert filter;
a first correlator;
a second correlator;
a decision variable calculator;
a threshold decision device; and
a demodulator;
wherein the N+1 matched filters are configured to separate the signal into the N+1 subcarriers with frequencies $f_0, f_1, \ldots, f_N$ to obtain a signal $r_0(t)$ in the subcarrier with frequency $f_0$ and signals $r_1(t), \ldots, r_N(t)$ in subcarriers with frequencies $f_1, \ldots, f_N$;
the second Hilbert transformer is configured to perform Hilbert transform on the signal $r_0(t)$ to obtain the signal $\tilde{r}_0(t)$;
the first correlator is configured to correlate the signal $r_0(t)$ respectively with the signals $r_1(t), \ldots, r_N(t)$ to obtain the first correlation variable $I_j$, j=1, 2, ..., N;
the second correlator is configured to correlate the signal $\tilde{r}_0(t)$; respectively with the signals $r_1(t), \ldots, r_N(t)$ to obtain the second correlation variable, $\bar{I}_j$, j=1, 2, ..., N;
the decision variable calculator is configured to subtract the absolute value of the second correlation variable $\bar{I}_j$ from the absolute value of the first correlation variable $I_j$ to obtain the final decision variable $\xi_j$;
the threshold decision device is configured to recover the index bit $a_k$ according to the final decision variable $\xi_j$; and
the demodulator is configured to determine the chaotic signal used for the subcarrier activation according to the index bit $a_k$, solve the decision metric for demodulating the modulated bit $b_k$; and obtain the modulated bit $b_k$ by demodulation according to the decision metric.

\* \* \* \* \*